United States Patent
Noguchi et al.

(10) Patent No.: US 9,632,213 B2
(45) Date of Patent: Apr. 25, 2017

(54) OPTICAL COMPENSATION FILM

(71) Applicant: DENKI KAGAKU KOGYO KABUSHIKI KAISHA, Tokyo (JP)

(72) Inventors: Tetsuo Noguchi, Ichihara (JP); Koichi Ozawa, Ichihara (JP); Masanori Matsumoto, Ichihara (JP); Yuichi Shimokoba, Ichihara (JP)

(73) Assignee: DENKA COMPANY LIMITED, Tokyo (JP)

( * ) Notice: Subject to any disclaimer, the term of this patent is extended or adjusted under 35 U.S.C. 154(b) by 0 days.

(21) Appl. No.: 14/417,430

(22) PCT Filed: Jul. 29, 2013

(86) PCT No.: PCT/JP2013/070487
§ 371 (c)(1),
(2) Date: Jan. 26, 2015

(87) PCT Pub. No.: WO2014/021265
PCT Pub. Date: Feb. 6, 2014

(65) Prior Publication Data
US 2015/0205012 A1 Jul. 23, 2015

(30) Foreign Application Priority Data
Jul. 30, 2012 (JP) ................. 2012-168118

(51) Int. Cl.
*G02B 1/08* (2006.01)
*C08F 212/08* (2006.01)
*B32B 27/08* (2006.01)
*B32B 27/30* (2006.01)
*G02B 1/04* (2006.01)
*G02B 5/30* (2006.01)
*C08F 220/14* (2006.01)
*C08F 222/08* (2006.01)

(52) U.S. Cl.
CPC ............ *G02B 1/08* (2013.01); *B32B 27/08* (2013.01); *B32B 27/302* (2013.01); *B32B 27/308* (2013.01); *C08F 212/08* (2013.01); *G02B 1/04* (2013.01); *G02B 5/3083* (2013.01); *B32B 2307/42* (2013.01); *B32B 2307/514* (2013.01); *B32B 2457/202* (2013.01); *B32B 2551/00* (2013.01); *C08F 220/14* (2013.01); *C08F 222/08* (2013.01)

(58) Field of Classification Search
CPC ...... C08F 24/00; C08F 220/12; C08F 220/10; C08F 222/04; C08F 212/08; C08L 33/08; C08L 25/12; C08L 33/12; C08L 25/14; C08L 2201/02; C08L 2201/10; C08L 2205/025; G02B 1/08; G02B 1/04; G02B 5/3083; B32B 27/08; B32B 27/408; B32B 27/302; B32B 2307/42; B32B 2307/514; B32B 2457/202; B32B 2551/00
USPC .................................................. 526/266, 319
See application file for complete search history.

(56) References Cited

U.S. PATENT DOCUMENTS

| | | | | |
|---|---|---|---|---|
| 3,725,360 A | * | 4/1973 | Adams ................. | C08F 222/08 526/146 |
| 4,387,191 A | * | 6/1983 | Dufour ................. | C08K 5/521 524/145 |
| 8,309,670 B2 | * | 11/2012 | Lee ........................ | G02B 1/105 349/96 |
| 2011/0171441 A1 | | 7/2011 | Choi et al. .................... | 428/212 |

FOREIGN PATENT DOCUMENTS

| | | | |
|---|---|---|---|
| CN | 101796086 A | | 8/2010 |
| JP | 60137915 A | * | 7/1985 |
| JP | 2-256023 A | | 10/1990 |
| JP | 2007-24940 A | | 2/2007 |
| JP | 2007024940 A | * | 2/2007 |
| JP | 2008-185659 A | | 8/2008 |
| JP | 2008185659 A | * | 8/2008 |
| JP | 2011-185965 A | | 9/2011 |
| JP | 2011185965 A | * | 9/2011 |
| WO | WO 2009/031544 A1 | | 3/2009 |

OTHER PUBLICATIONS

International Search Report dated Aug. 27, 2013, issued to the corresponding International Application No. PCT/JP2013/070487.
Extended European Search Report dated Aug. 26, 2015, issued to European Application No. 13825629.
Chinese Office Action dated May 23, 2016, issued by the Chinese Patent Office in corresponding application CN 201380040693.0.

* cited by examiner

*Primary Examiner* — Michael M Bernshteyn
(74) *Attorney, Agent, or Firm* — Stein IP, LLC

(57) ABSTRACT

A copolymer for optical compensation film showing a negative orientation birefringence, having excellent transparency, heat resistance, film strength, and optical properties, and is capable of obtaining a beautiful film suitable for an optical compensation film is provided. A copolymer for optical compensation film, containing: 45 to 80 mass % of an aromatic vinyl monomer unit; 5 to 45 mass % of a (meth)acrylic acid ester monomer unit; and 5 to 20 mass % of an unsaturated dicarboxylic acid anhydride monomer unit; wherein the copolymer has an average number molecular weight (Mn) of $5.5 \times 10^4$ to $9 \times 10^4$ and a weight average molecular weight (Mw) of $14 \times 10^4$ to $20 \times 10^4$; and the copolymer has a haze of 1% or less, the haze being measured with a 2 mm thick sample in accordance with ASTM D1003, is provided.

7 Claims, No Drawings

OPTICAL COMPENSATION FILM

CROSS-REFERENCE TO RELATED APPLICATIONS

This application is a national stage of International Application No. PCT/JP2013/070487, filed Jul. 29, 2013, which claims the benefit of priority to Japanese Application No. 2012-168118, filed Jul. 30, 2012, in the Japanese Patent Office. All disclosures of the document(s) named above are incorporated herein by reference.

BACKGROUND OF THE INVENTION

1. Field of the Invention

The present invention relates to a copolymer for optical compensation film. More particularly, the present invention relates to a copolymer for optical compensation film showing a negative orientation birefringence, having excellent transparency, heat resistance, film strength, and optical properties, and capable of providing a beautiful film suitable for an optical compensation film.

2. Description of the Related Art

As an optical compensation film of a liquid crystal display, stretched film obtained by uniaxial stretching or biaxial stretching of a resin film is widely used. As a typical example of the optical compensation film, retardation film can be mentioned. A $\lambda/2$ plate to convert the vibration direction of the polarized light or a $\lambda/4$ plate to convert a circularly polarized light into a linearly polarized light or to convert a linearly polarized light into a circularly polarized light are widely used.

The retardation film is required to show optical compensation in a wide range of vision. It is an extremely important property for the retardation film to have hardly any phase difference even for the incoming light from an oblique direction. Regarding such property required, Patent Literature 1 discloses a liquid crystal display comprising a laminated body of a transparent stretched film having a negative orientation birefringence and a transparent stretched film having a positive orientation birefringence.

Patent Literature 2 discloses a method for widening the view angle of the liquid crystal display by using an optical compensation film structured by laminating a stretched film showing a negative orientation birefringence and a stretched film showing a positive orientation birefringence in a manner so that the slow axes of each of the stretched films are parallel, the optical compensation film having an in-plane phase difference (Re) in the range of 60 to 300 nm, and an orientation parameter (Nz) in the range of 0.5±0.1. In addition, Patent Literature 2 discloses that a stretched film showing a negative intrinsic birefringence is a resin composition of a copolymer of α-olefin and N-phenylmaleimide and an acrylonitrile-styrene copolymer.

As the thermoplastic resin showing a positive orientation birefringence, polycarbonate and an amorphous cyclic polyolefin can be mentioned. They are suitably used for the optical compensation film due to the excellent heat resistance, transparency, film strength, and phase difference development. On the other hand, as the thermoplastic resin showing a negative orientation birefringence, examples of practical application is extremely rare since whichever one of heat resistance, transparency, film strength, and phase difference development is inferior. The ones that have practical applications are mainly structured by bonding a plurality of stretched film showing a positive orientation birefringence with an appropriate angle. Therefore, designation of optical compensation is complicated and its cost is high, while the optical compensation performance is insufficient. From the viewpoint of improvement in optical compensation performance, simplification of optical design, and reduction in cost, a thermoplastic resin showing a negative orientation birefringence which can be practically applied for the optical compensation film is desired.

Regarding such requirements, Patent Literature 3 suggests a thermoplastic resin copolymer having excellent transparency, heat resistance, film formability, film strength, and phase difference development; and a stretched film showing a negative orientation birefringence. It is true that the film formability is superior regarding a general film forming processing, however, films for optical compensation require extremely beautiful film free of foreign substances. When manufactured by melt extrusion, a polymer filter with extremely small sieve is often used for removing foreign substances. Here, the thermoplastic resin copolymer of Patent Literature 3 has high melt viscosity, and thus it tends to remain in the polymer filter. In addition, high temperature is required to avoid pressure loss, which can result in thermal decomposition of the resin causing foams and die lines. Therefore, the range of application was limited.

CITATION LIST

Patent Literature

[Patent Literature 1] JP 2-256023A
[Patent Literature 1] JP 2007-24940A
[Patent Literature 1] WO 2009/031544

SUMMARY OF THE INVENTION

Technical Problem

An object of the present invention is to provide a copolymer for optical compensation film showing a negative orientation birefringence, having excellent transparency, heat resistance, film strength, and optical properties, and capable of obtaining a beautiful film suitable for an optical compensation film.

Solution to Problem

The present invention is summarized as follows.
(1) A copolymer for optical compensation film, comprising:
45 to 80 mass % of an aromatic vinyl monomer unit;
5 to 45 mass % of a (meth)acrylic acid ester monomer unit; and
5 to 20 mass % of an unsaturated dicarboxylic acid anhydride monomer unit; wherein
the copolymer has an average number molecular weight (Mn) of $5.5 \times 10^4$ to $9 \times 10^4$ and a weight average molecular weight (Mw) of $14 \times 10^4$ to $20 \times 10^4$; and
the copolymer has a haze of 1% or less, the haze being measured with a 2 mm thick sample in accordance with ASTM D1003.
(2) The copolymer for optical compensation film of (1), comprising:
55 to 75 mass % of the aromatic vinyl monomer unit;
15 to 35 mass % of the (meth)acrylic acid ester monomer unit; and
10 to 15 mass % of the unsaturated dicarboxylic acid anhydride monomer unit.

(3) The copolymer for optical compensation film of (1) or (2), wherein the aromatic vinyl monomer unit is a styrene unit.

(4) The copolymer for optical compensation film of any one of (1) to (3), wherein the (meth)acrylic acid ester monomer unit is a methyl methacrylate unit.

(5) The copolymer for optical compensation film of any one of (1) to (4), wherein the unsaturated dicarboxylic acid anhydride monomer unit is a maleic acid anhydride unit.

(6) The copolymer for optical compensation film of any one of (1) to (5), wherein the optical compensation film has a refractive index profile of nx>nz>ny and is obtained by laminating Film A and Film B, Film A being obtained by stretching a thermoplastic resin film showing a negative orientation birefringence, Film B being obtained by stretching a thermoplastic resin showing a positive orientation birefringence; and the copolymer is a thermoplastic resin used for Film A.

(7) The copolymer for optical compensation film of (6), wherein Film A is obtained by stretching a film manufactured by melt extrusion.

(8) The copolymer for optical compensation film of (6) or (7), wherein Nz coefficient is 0.4 to 0.6.

(9) The copolymer for optical compensation film of any one of (6) to (8), wherein:
Film A and Film B are laminated so that slow axes thereof cross at right angles, allowing in-plane phase difference to satisfy the relationship of Re(450)<Re(590)<Re(750), Re(450), Re(590), and Re(750) being in-plane phase difference for the wavelengths of 450 nm, 590 nm, and 750 nm, respectively.

Advantageous Effects of Invention

The present invention provides a copolymer for optical compensation film showing a negative orientation birefringence, having excellent transparency, heat resistance, film strength, and optical properties, and capable of obtaining a beautiful film suitable for an optical compensation film.

Additional aspects and/or advantages of the invention will be set forth in part in the description which follows and, in part, will be obvious from the description, or may be learned by practice of the invention.

DETAILED DESCRIPTION OF THE EMBODIMENTS

Explanation of Terms

In the present specification, the description "A to B" means A or more and B or less.

Hereinafter, embodiments of the present invention will be described in detail.

As the aromatic vinyl monomer unit, units derived from various styrene-based monomers such as styrene, o-methyl styrene, m-methyl styrene, p-methyl styrene, 2,4-dimethyl styrene, ethyl styrene, p-tert-butyl styrene, α-methyl styrene, and α-methyl-p-methyl styrene can be mentioned. Among these, styrene unit is preferable. The aromatic vinyl monomer unit can comprise one type of these units or can comprise two or more types of these units.

As the (meth)acrylic acid ester monomer unit, units derived from various methacrylic acid ester monomers such as methyl methacrylate, ethyl methacrylate, n-butyl methacrylate, 2-ethylhexyl methacrylate, dicyclopentanyl methacrylate, isobornyl methacrylate; and various acrylic acid ester monomers such as methyl acrylate, ethyl acrylate, n-butyl acrylate, 2-methylhexyl acrylate, 2-ethylhexyl acrylate, decyl acrylate can be mentioned. Among these, methyl methacrylate unit is preferable. The (meth)acrylic acid ester monomer unit can comprise one type of these units or can comprise two or more types of these units.

As the unsaturated dicarboxylic acid anhydride monomer unit, units derived from various acid anhydride monomers such as maleic anhydride, itaconic anhydride, citraconic anhydride, and aconitic anhydride can be mentioned. Among these, maleic anhydride unit is preferable. The unsaturated dicarboxylic acid anhydride monomer unit can comprise one type of these units or can comprise two or more types of these units.

The constitutional units of the copolymer according to the present invention is 45 to 80 mass % of the aromatic vinyl monomer unit, 5 to 45 mass % of the (meth)acrylic acid ester monomer unit, and 5 to 20 mass % of the unsaturated dicarboxylic acid anhydride monomer unit. Preferably, the constitutional units of the copolymer is 55 to 75 mass % of the aromatic vinyl monomer unit, 15 to 35 mass % of the (meth)acrylic acid ester monomer unit, and 10 to 15 mass % of the unsaturated dicarboxylic acid anhydride monomer unit.

Preferable content of the aromatic vinyl monomer unit is 80 mass % or less, since the heat resistance or the film strength can be improved; and 75 mass % or less, since the heat resistance or the film strength can be further improved. Preferable content of the (meth)acrylic acid ester monomer unit is 45 mass % or less, since the optical properties, particularly the negative orientation birefringence can be improved, and a beautiful film suitable for optical compensation can be obtained when a film forming processing by melt extrusion is performed; and 35 mass % or less, since the negative orientation birefringence can be further improved, and a more beautiful film can be obtained. Preferable content of the unsaturated dicarboxylic acid anhydride monomer unit is 20 mass % or less, since the film strength can be improved, and a beautiful film suitable for optical compensation can be obtained when a film forming processing by melt extrusion is performed; and 15 mass % or less, since the film strength can be further improved and a more beautiful film can be obtained. On the other hand, preferable content of the aromatic vinyl monomer unit is 45 mass % or more, since the optical properties, particularly the negative orientation birefringence can be improved, and a beautiful film suitable for optical compensation can be obtained when a film forming processing by melt extrusion is performed; and 55 mass % or more, since the negative orientation birefringence can be further improved, and a more beautiful film can be obtained. Preferable content of the (meth)acrylic acid ester monomer unit is 5 mass % or more, since the transparency and the film strength can be improved; and 15 mass % or more, since the transparency and the film strength can be further improved. Preferable content of the unsaturated dicarboxylic acid anhydride monomer unit is 5 mass % or more, since the heat resistance can be improved; and 10 mass % or more, since the heat resistance can be further improved.

If necessary, the copolymer of the present invention can contain a copolymerizable vinyl monomer unit other than the aromatic vinyl monomer unit, the (meth)acrylic acid ester monomer unit, and the unsaturated dicarboxylic acid anhydride monomer unit, by an amount which does not have an adverse effect to the effect of the present invention. Here, the preferable amount is 5 mass % or less. As an example of the copolymerizable vinyl monomer unit, units derived from vinyl cyanide monomers such as acrylonitrile and methacrylonitrile; vinyl carboxylic acid monomers such as acrylic acid and methacrylic acid; N-alkyl maleimide monomers such as N-methyl maleimide, N-ethyl maleimide, N-butyl maleimide, and N-cyclohexyl maleimide; N-aryl maleimide monomers such as N-phenyl maleimide, N-methylphenyl maleimide, and N-chlorophenyl maleimide can be mentioned. The copolymerizable vinyl monomer unit can comprise two or more types of these units.

The copolymer of the present invention has a number average molecular weight (Mn) in the range of $5.5 \times 10^4$ to $9 \times 10^4$, and a weight average molecular weight (Mw) in the range of $14 \times 10^4$ to $20 \times 10^4$. Preferably, the number average molecular weight (Mn) is in the range of $6.0 \times 10^4$ to $8.5 \times 10^4$, and the weight average molecular weight (Mw) is in the range of $14.5 \times 10^4$ to $19 \times 10^4$. More preferably, the number average molecular weight (Mn) is in the range of $6.5 \times 10^4$ to $8 \times 10^4$, and the weight average molecular weight (Mw) is in the range of $15 \times 10^4$ to $18 \times 10^4$.

The number average molecular weight (Mn) and the weight average molecular weight (Mw) are values converted to a molecular weight of polystyrene measured by gel permeation chromatography (GPC). The values measured are obtained by the following measuring conditions.

Name of Instrument: SYSTEM-21 Shodex (available from Showa Denko K.K.)
  Column: PL gel MIXED-B, 3 columns connected in series
  Temperature: 40° C.
  Detection: differential refractive index
  Eluent: tetrahydrofuran
  Concentration: 2 mass %
  Callibration Curve: standard polystyrene (PS) (available from Polymer Laboratories Ltd) was used for preparation When the number average molecular weight (Mn) is $5.5 \times 10^4$ or more and the weight average molecular weight (Mw) is $14 \times 10^4$ or more, the formability of the film is excellent, and the strength of the film obtained by stretching can be improved. On the other hand, when the number average molecular weight (Mn) is $9 \times 10^4$ or less and the weight average molecular weight (Mw) is $20 \times 10^4$ or less, a beautiful film suitable for optical compensation can be obtained when a film forming processing by melt extrusion is performed.

The copolymer of the present invention has a haze of 1% or less, the haze being measured with a 2 mm thick sample in accordance with ASTM D1003. Preferably, the haze if 0.8% or less, and more preferably 0.6% or less. When the haze regarding a 2 mm thick sample is 1% or less, a film having a small copolymer composition distribution and an excellent film strength, and having excellent transparency after film forming or stretching processing is performed, can be obtained.

Here, the haze is a measurement value obtained as follows. First, a mirror plate having a length of 90 mm, a width of 55 mm, and a thickness of 2 mm was prepared using an injection moulding machine (IS-50EPN, available from TOSHIBA MACHINE CO., LTD.), with the molding conditions of a cylinder temperature of 230° C. and a mold temperature of 40° C. Then, the mirror plate was subjected to the measurement in compliance with ASTM D1003, using a haze meter (NDH-1001DP, available from NIPPON DENSHOKU INDUSTRIES CO., LTD.).

The copolymer of the present invention is suitably used for the optical compensation film since it has an excellent transparency for preserving the image quality of the liquid crystal device; heat resistance for preventing the change in orientation birefringence under high temperature environment; film strength for enduring film processing such as stretching processing, cutting, and punching out; and film forming processing property and heat stability for obtaining a beautiful film; and also has a negative orientation birefringence. The term negative orientation birefringence refers to a property which shows smaller refractive index with respect to the orientation direction of the molecules. Here, the term positive orientation birefringence refers to a property which shows larger refractive index with respect to the orientation direction of the molecules. As the optical compensation film, a retardation film or an antireflection film obtained by controlling the orientation birefringence of a stretched film is used.

There is no particular limitation regarding the method for processing the copolymer of the present invention into the optical compensation film. Here, the processing can be performed by known techniques such as the melt extrusion method and the cast method. Generally, the melt extrusion method is superior to the cast method in view of energy cost and the environmental burden. However, in order to obtain an optical compensation film free of foreign substances, it is necessary to use a polymer filter with extremely small sieve. This would cause pressure loss by the polymer filter, resulting in generation of heat by shearing and thermal decomposition. On the other hand, when a large polymer filter is installed, thermal decomposition due to the polymer remaining in the polymer filter, gellation, or resin burning occur, and thus it becomes difficult to obtain a beautiful film. Therefore, cast method is often adopted. Since the copolymer of the present invention is excellent in heat resistance, thermal stability, and formability, a beautiful optical compensation film can be processed also by the melt extrusion method. Therefore, application of the melt extrusion method, which is a film processing method excellent in view of productivity, energy cost, and environmental burden, is especially preferable.

There is no particular limitation regarding the way the copolymer of the present invention is applied for the optical compensation film. It is preferable that a stretched Film A comprising the copolymer of the present invention and a stretched Film B comprising a thermoplastic resin showing a positive orientation birefringence are laminated, thereby obtaining an optical compensation film having a refractive index profile of nx>nz>ny. It is especially preferable that the optical compensation film has an Nz coefficient of 0.4 to 0.6. Here, nx is a refractive index in the slow axis direction of the optical compensation film plane, ny is a refractive index in the fast axis direction of the film plane, and nz is a refractive index in the perpendicular direction with respect to the film plane, that is, in the thickness direction. The slow axis is in a direction in which the refractive index within the film plane shows the maximum value, and the fast axis is in a direction perpendicular to the slow axis and is within the film plane. The Nz coefficient is provided by the following Equation (1).

$$Nz=(nx-nz)/(nx-ny) \quad (1)$$

Since there is hardly any phase difference for the incoming light from an oblique direction, the optical compensation film having a refractive index profile of nx>nz>ny, especially the optical compensation film having an Nz coefficient of 0.4 to 0.6, is used as the optical compensation film for wide viewing range. However, when a thermoplastic resin film having a negative orientation birefringence is subjected to the uniaxial stretching or the biaxial stretching which are general stretching methods, the film thus obtained would have a refractive index profile of nz≥nx>ny. On the other hand, when a thermoplastic resin film having a positive orientation birefringence is subjected to the uniaxial stretching or the biaxial stretching which are general stretching methods, the film thus obtained would have a refractive index profile of nx≥ny>nz. Therefore, in order to obtain an optical compensation film having a refractive index profile of nx>nz>ny, a method in which Film A prepared by stretching a thermoplastic resin having a negative orientation birefringence and Film B prepared by stretching a thermoplastic resin having a positive orientation birefringence are laminated is effective. The copolymer of the present invention is especially suitable for Film A.

In a particularly preferable way to apply the copolymer of the present invention for the optical compensation film, a stretched Film A comprising the copolymer of the present invention and a stretched Film B comprising a thermoplastic resin showing a positive orientation birefringence are laminated so that the slow axes cross at right angles. The optical compensation film thus obtained would have an in-plane phase difference satisfying the relationship of Re(450)<Re(590)<Re(750). Here, Re(450), Re(590), and Re(750) are in-plane phase difference for the wavelengths of 450 nm, 590 nm, and 750 nm, respectively. As a typical example of the optical compensation film, a λ/2 plate to convert the vibration direction of the polarized light or a λ/4 plate to convert a circularly polarized light into a linearly polarized light or to convert a linearly polarized light into a circularly polarized light can be mentioned. Here, it is ideal that the in-plane phase difference for each of the light having a wavelength in the visible light region is λ/2 or λ/4. For example, when the λ/2 plate is used, it is ideal from the viewpoint of color compensation that Re(450)=225 m, Re(590)=295 nm, and Re(750)=375 are satisfied. Generally for the thermoplastic resin, the in-plane phase difference Re tends to become larger with shorter wavelength. Such characteristic is known as the positive chromatic dispersion characteristic. On the other hand, the opposite characteristic, that is, the characteristic in which the in-plane phase difference Re becomes smaller with shorter wavelength is known as the reverse wavelength dispersion characteristic. As a method for obtaining a film having the reverse wavelength dispersion characteristic (that is, a film satisfying the relationship of Re(450)<Re(590)<Re(750)) by laminating the stretched Film A and the stretched Film B having the positive chromatic dispersion characteristic so that the slow axes cross at right angles, the following can be mentioned for example. When the wavelength dependency of in-plane phase difference Re of the stretched Film A is larger than that of the stretched Film B, the stretched films are prepared so that the in-plane phase difference Re of the stretched Film A is smaller than that of the stretched Film B, and then the films are laminated so that the slow axes cross at right angles. Accordingly, a film having the reverse wavelength dispersion characteristic is obtained.

The manufacturing method of the copolymer of the present invention will be described.

There is no particular limitation regarding the polymerization method. Here, the copolymer can be manufactured by known methods such as solution polymerization, bulk polymerization, and the like; and the solution polymerization is preferable. The solvent used in the solution polymerization is preferably nonpolymerizable, since it hardly produces by-products, and the adverse effect is less. There is no particular limitation with respect to the type of the solvent. For example, ketones such as acetone, methyl ethyl ketone, methyl isobutyl ketone, and acetophenone; ethers such as tetrahydrofuran, and 1,4-dioxane; aromatic hydrocarbons such as toluene, ethyl benzene, xylene, and chlorobenzene, can be mentioned. Here, from the viewpoint of the solubility of the monomers and the copolymer, and the ease to collect the solvent, methyl ethyl ketone and methyl isobutyl ketone are preferable. The addition amount of the solvent is preferably 10 to 100 parts by mass, more preferably 30 to 80 parts by mass, with respect to 100 parts by mass of the copolymer to be obtained. When the addition amount is 10 parts by mass or more, it is preferable in view of controlling the reaction speed and the viscosity of the polymer solution. When the addition amount is 100 parts by mass or less, it is preferable in view of obtaining the desired number average molecular weight (Mn) and weight average molecular weight (Mw).

The polymerizing process can be any one of the batch type polymerization method, semi-batch type polymerization method, and continuous polymerization method. Here, the batch type polymerization method is preferable in view of obtaining the desired molecular weight range and transparency.

There is no particular limitation regarding the type of polymerization. Here, radical polymerization method is preferable in view of manufacturing by a simple process with high productivity. There is no particular limitation regarding the polymerization initiator. For example, known organic peroxides such as benzoyl peroxide, t-butyl peroxybenzoate, 1,1-bis(t-butyl peroxy)-2-methylcyclohexane, t-butyl peroxy isopropyl monocarbonate, t-butyl peroxy-2-ethylhexanoate, t-butyl peroxyacetate, dicumyl peroxide, and ethyl-3,3-di-(t-butyl peroxy) butylate; and known azo compounds such as azobisisobutyronitrile, azobiscyclohexanecarbonitrile, azobismethylpropionitrile, and azobismethylbutyronitrile; can be used. These polymerization initiators can be used by two or more types in combination. Among these, organic peroxides having the 10 hour half life temperature in the range of 70 to 110° C. is preferably used.

The copolymer of the present invention has a number average molecular weight (Mn) in the range of $5.5 \times 10^4$ to $9 \times 10^4$, and a weight average molecular weight (Mw) of $14 \times 10^4$ to $20 \times 10^4$. In addition, the copolymer of the present invention has a haze of 1% or less, the haze being measured with a 2 mm thick sample in accordance with ASTM D1003. There is no particular limitation regarding the polymerization procedure so long as the copolymer satisfying the above conditions is obtained. Here, in order to obtain a copolymer having a transparency with a haze of 1% or less, the polymerization need be carried out so that the composition distribution in the copolymer becomes small. Since the aromatic vinyl monomer and the unsaturated dicarboxylic acid anhydride monomer have high alternating copolymerization property, it is preferable to add the unsaturated dicarboxylic acid anhydride monomer separately so as to correspond with the polymerization speed of the aromatic vinyl monomer and the (meth)acrylic acid ester monomer. The polymerization speed can be controlled by adjusting polymerization temperature, polymerization period, and addition amount of the polymerization initiator. It is preferable to add the polymerization initiator separately, since the polymerization speed can be controlled easily. In addition, in order to obtain a copolymer having a number average molecular weight (Mn) in the range of $5.5 \times 10^4$ to $9 \times 10^4$ and a weight average molecular weight (Mw) of $14 \times 10^4$ to $20 \times 10^4$, addition amount of the solvent and the addition amount of the chain transfer agent shall be adjusted in addition to the adjustment of polymerization temperature, polymerization period, and the addition amount of the polymerization initiator. There is no particular limitation regarding the chain transfer agent. For example, known chain transfer agents such as n-dodecyl mercaptan, t-dodecyl mercaptan, and 2,4-diphenyl-4-methyl-1-pentene can be used.

After the completion of the polymerization, thermal stabilizers such as hindered phenol-based compounds, lactone-based compounds, phosphorus-based compounds, and sulfur-based compounds; light stabilizers such as hindered amine-based compounds, and benzotriazole-based compounds; lubricants; plasticizers; colorants; anti-static agents; mineral oils; and the like can be added to the polymer solution as necessary. It is preferable that the addition amount of such additive is less than 0.2 parts by mass with respect to 100 parts by mass of the entire monomer unit. These additives can be used singly, or in a combination of two or more types.

There is no particular limitation regarding the method for collecting the copolymer of the present invention from the polymerization solution. Here, known devolatilization technique can be used. For example, a method in which the polymerization solution is continuously fed to a twin-screw devolatilizing extruder using a gear pump, followed by devolatilization treatment of the polymerization solvent, unreacted monomers, and the like, can be mentioned. Here, the devolatilization component including the polymerization solvent, unreacted monomers, and the like can be collected by condensation using a condenser and the like. Then, the condensed solution can be purified using a distilling column, and the polymerization solvent can be recycled.

EXAMPLES

Hereinafter, the present invention will be described further with reference to Examples and Comparative Examples. However, they are merely provided as examples, and thus the present invention shall not be limited to these.

Example 1

A 20% maleic acid anhydride solution was prepared by dissolving maleic acid anhydride in methyl isobutyl ketone so that the maleic acid anhydride is contained by 20 mass %, and a 2% t-butyl peroxy-2-ethyl hexanoate solution was prepared by diluting t-butyl peroxy-2-ethyl hexanoate with methyl isobutyl ketone so that the t-butyl peroxy-2-ethyl hexanoate is contained by 2 mass %. These solutions were used in the polymerization.

To a 120 liter autoclave equipped with an agitator, 20% maleic acid anhydride solution (2 kg), styrene (24 kg), methyl methacrylate (12 kg), t-dodecyl mercaptan (30 g), and methyl isobutyl ketone (2 kg) were added. The gas in the remaining space of the autoclave was replaced with nitrogen gas, and the temperature of the mixture was raised to 87° C. taking 40 minutes with agitation. After raising the temperature, the temperature of the mixture was kept at 87° C., 20% maleic acid anhydride solution was added separately at an addition speed of 1.5 kg/hour, and the 2% t-butyl peroxy-2-ethyl hexanoate solution was added separately at an addition speed of 375 g/hour. Here, each of the solutions was added continuously for 8 hours. Subsequently, the separate addition of the 2% t-butyl peroxy-2-ethyl hexanoate solution was terminated, and t-butyl peroxy isopropyl monocarbonate (30 g) was added. On the other hand, the 20% maleic acid anhydride solution was added separately keeping the addition speed of 1.5 kg/hour, and the temperature of the mixture was raised to 120° C. with a temperature raising speed of 8.25° C./hour taking 4 hours. The separate addition of the 20% maleic acid anhydride solution was terminated when the accumulated amount of the separate addition reached 18 kg. After the temperature of the mixture was raised, the mixture was kept at 120° C. for 1 hour, and the polymerization was completed. After the polymerization was completed, a small amount of the polymerization solution was taken as a sample, and the polymerization rate for each of the monomers were measured. The polymerization solution was continuously fed to a twin-screw devolatilizing extruder using a gear pump, followed by devolatilization treatment of methyl isobutyl ketone, a small amount of unreacted monomers, and the like, thereby obtaining the copolymer A-1. The copolymer A-1 thus obtained was subjected to composition analysis using C-13NMR method. Subsequently, molecular weight was measured using GPC. Then, a mirror plate having a thickness of 2 mm was molded using an injection molding machine, and haze was measured using a haze meter. The polymerization rate for each of the monomers, result of the composition analysis, result of the molecular weight measurement, and the result of haze measurement are shown in Table 1.

In a clean booth having a clean environment of Class 1000 under standing conditions, a film having a thickness of 0.2 mm±0.01 mm was formed using the copolymer A-1. Here, a film forming machine was equipped with a 40 mmφ single screw extruder, a gear pump, a polymer filter "DENAFILTER, 5 μm sieve" (available from Nagase & CO., LTD), 300 mm width monolayer T-die, and a take up/winder equipment "Touch Roll Flexible Type" (available from PLABOR Research Laboratory of Plastics Technology Co., Ltd). In addition, film property was measured for the films obtained. The results of measurement are shown in Table 3.

Example 2

The 20% maleic acid anhydride solution and the 2% t-butyl peroxy-2-ethyl hexanoate solution were prepared in a similar manner as Example 1.

To a 120 liter autoclave equipped with an agitator, 20% maleic acid anhydride solution (2.8 kg), styrene (26.4 kg), methyl methacrylate (8 kg), and t-dodecyl mercaptan (40 g) were added. The gas in the remaining space of the autoclave was replaced with nitrogen gas, and the temperature of the mixture was raised to 90° C. taking 40 minutes with agitation. After raising the temperature, the temperature of the mixture was kept at 90° C., the 20% maleic acid anhydride solution was added separately at an addition speed of 2.0 kg/hour, and the 2% t-butyl peroxy-2-ethyl hexanoate solution was added separately at an addition speed of 375 g/hour. Here, each of the solutions was added continuously for 8 hours. Subsequently, the separate addition of the 2% t-butyl peroxy-2-ethyl hexanoate solution was terminated, and t-butyl peroxy isopropyl monocarbonate (40 g) was added. On the other hand, the 20% maleic acid anhydride solution was added separately keeping the addition speed of 2.0 kg/hour, and the temperature of the mixture was raised to 120° C. with a temperature raising speed of 6° C./hour taking 5 hours. The separate addition of the 20% maleic acid anhydride solution was terminated when the accumulated amount of the separate addition reached 25.2 kg. After the temperature of the mixture was raised, the mixture was kept at 120° C. for 1 hour, and the polymerization was completed. After the polymerization was completed, a small amount of the polymerization solution was taken as a sample, and the polymerization rate for each of the monomers were measured. The polymerization solution was continuously fed to a twin-screw devolatilizing extruder using a gear pump, followed by devolatilization treatment of methyl isobutyl ketone, a small amount of unreacted monomers, and the like, thereby obtaining the copolymer A-2. In a similar manner as Example 1, the copolymer A-2 thus obtained was subjected to measurement of the polymerization rate for each of the monomers, composition, molecular weight, and haze. The results are shown in Table 1.

Formation of films, and measurement of film property were conducted in a similar manner as Example 1. The results of measurement are shown in Table 3.

Example 3

The 20% maleic acid anhydride solution and the 2% t-butyl peroxy-2-ethyl hexanoate solution were prepared in a similar manner as Example 1.

To a 120 liter autoclave equipped with an agitator, 20% maleic acid anhydride solution (2.4 kg), styrene (28 kg), methyl methacrylate (5.8 kg), t-dodecyl mercaptan (16 g), and methyl isobutyl ketone (1 kg) were added. The gas in the remaining space of the autoclave was replaced with nitrogen gas, and the temperature of the mixture was raised to 90° C. taking 40 minutes with agitation. After raising the temperature, the temperature of the mixture was kept at 90° C., the 20% maleic acid anhydride solution was added separately at an addition speed of 1.54 kg/hour, methyl methacrylate was added separately at an addition speed of 100 g/hour, and the 2% t-butyl peroxy-2-ethyl hexanoate solution was added separately at an addition speed of 300 g/hour. Here, each of the solutions was added continuously for 10 hours. Subsequently, the separate addition of the 2% t-butyl peroxy-2-ethyl hexanoate solution was terminated, and t-butyl peroxy isopropyl monocarbonate (32 g) was added. On the other hand, the 20% maleic acid anhydride solution was added separately keeping the addition speed of 1.54 kg/hour, and methyl methacrylate was added separately keeping the addition speed of 100 g/hour, and the temperature of the mixture was raised to 130° C. with a temperature raising speed of 10° C./hour taking 4 hours. The separate addition of the 20% maleic acid anhydride solution was terminated when the accumulated amount of the separate addition reached 21.6 kg, and the separate addition of methyl methacrylate was terminated when the accumulated amount of the separate addition reached 1.4 kg. After the temperature of the mixture was raised, the mixture was kept at 130° C. for 1 hour, and the polymerization was completed. After the polymerization was completed, a small amount of the polymerization solution was taken as a sample, and the polymerization rate for each of the monomers were measured. The polymerization solution was continuously fed to a twin-screw devolatilizing extruder using a gear pump, followed by devolatilization treatment of methyl isobutyl ketone, a small amount of unreacted monomers, and the like, thereby obtaining the copolymer A-3. In a similar manner as Example 1, the copolymer A-3 thus obtained was subjected to measurement of the polymerization rate for each of the monomers, composition, molecular weight, and haze. The results are shown in Table 1.

Formation of films, and measurement of film property were conducted in a similar manner as Example 1. The results of measurement are shown in Table 3.

Example 4

A 10% maleic acid anhydride solution was prepared by dissolving maleic acid anhydride in methyl isobutyl ketone so that the maleic acid anhydride is contained by mass concentration of 10, and a 2% t-butyl peroxy-2-ethyl hexanoate solution was prepared by diluting t-butyl peroxy-2-ethyl hexanoate with methyl isobutyl ketone so that the t-butyl peroxy-2-ethyl hexanoate is contained by 2 mass %. These solutions were used in the polymerization.

To a 120 liter autoclave equipped with an agitator, 10% maleic acid anhydride solution (2 kg), styrene (24 kg), methyl methacrylate (14 kg), t-dodecyl mercaptan (48 g), and methyl isobutyl ketone (2 kg) were added. The gas in the remaining space of the autoclave was replaced with nitrogen gas, and the temperature of the mixture was raised to 90° C. taking 40 minutes with agitation. After raising the temperature, the temperature of the mixture was kept at 90° C., the 10% maleic acid anhydride solution was added separately at an addition speed of 1.5 kg/hour, and the 2% t-butyl peroxy-2-ethyl hexanoate solution was added separately at an addition speed of 300 g/hour. Here, each of the solutions was added continuously for 8 hours. Subsequently, the separate addition of the 2% t-butyl peroxy-2-ethyl hexanoate solution was terminated, and t-butyl peroxy isopropyl monocarbonate (40 g) was added. On the other hand, the 10% maleic acid anhydride solution was added separately keeping the addition speed of 1.5 kg/hour, and the temperature of the mixture was raised to 120° C. with a temperature raising speed of 7.5° C./hour taking 4 hours. The separate addition of the 10% maleic acid anhydride solution was terminated when the accumulated amount of the separate addition reached 18 kg. After the temperature of the mixture was raised, the mixture was kept at 120° C. for 1 hour, and the polymerization was completed. After the polymerization was completed, a small amount of the polymerization solution was taken as a sample, and the polymerization rate for each of the monomers were measured. The polymerization solution was continuously fed to a twin-screw devolatilizing extruder using a gear pump, followed by devolatilization treatment of methyl isobutyl ketone, a small amount of unreacted monomers, and the like, thereby obtaining the copolymer A-4. In a similar manner as Example 1, the copolymer A-4 thus obtained was subjected to measurement of the polymerization rate for each of the monomers, composition, molecular weight, and haze. The results are shown in Table 1.

Formation of films, and measurement of film property were conducted in a similar manner as Example 1. The results of measurement are shown in Table 3.

Example 5

The 20% maleic acid anhydride solution and the 2% t-butyl peroxy-2-ethyl hexanoate solution were prepared in a similar manner as Example 1.

To a 120 liter autoclave equipped with an agitator, 20% maleic acid anhydride solution (2 kg), styrene (32 kg), methyl methacrylate (3 kg), t-dodecyl mercaptan (30 g), and methyl isobutyl ketone (2 kg) were added. The gas in the remaining space of the autoclave was replaced with nitrogen gas, and the temperature of the mixture was raised to 90° C. taking 40 minutes with agitation. After raising the temperature, the temperature of the mixture was kept at 90° C., the 20% maleic acid anhydride solution was added separately at an addition speed of 0.95 kg/hour, methyl methacylate was added separately at an addition speed of 53 g/hour, and the 2% t-butyl peroxy-2-ethyl hexanoate solution was added separately at an addition speed of 333 g/hour. Here, each of the solutions was added continuously for 12 hours. Subsequently, the separate addition of the 2% t-butyl peroxy-2-ethyl hexanoate solution was terminated, and t-butyl peroxy isopropyl monocarbonate (40 g) was added. On the other hand, the 20% maleic acid anhydride solution was added separately keeping the addition speed of 0.95 kg/hour, and methyl methacrylate was added separately keeping the addition speed of 53 g/hour, and the temperature of the mixture was raised to 125° C. with a temperature raising speed of 5° C./hour taking 7 hours. The separate addition of the 20% maleic acid anhydride solution was terminated when the accumulated amount of the separate addition reached 18 kg, and the separate addition of the methyl methacrylate was terminated when the accumulated amount of the separate addition reached 1 kg. After the temperature of the mixture was raised, the mixture was kept at 125° C. for 1 hour, and the polymerization was completed. After the polymerization was completed, a small amount of the polymerization solution was taken as a sample, and the polymerization rate for each of the monomers were measured. The polymerization solution was continuously fed to a twin-screw devolatilizing extruder using a gear pump, followed by devolatilization treatment of methyl isobutyl ketone, a small amount of unreacted monomers, and the like, thereby obtaining the copolymer A-5. In a similar manner as Example 1, the copolymer A-5 thus obtained was subjected to measurement of the polymerization rate for each of the monomers, composition, molecular weight, and haze. The results are shown in Table 1.

Formation of films, and measurement of film property were conducted in a similar manner as Example 1. The results of measurement are shown in Table 3.

Example 6

The 20% maleic acid anhydride solution and the 2% t-butyl peroxy-2-ethyl hexanoate solution were prepared in a similar manner as Example 1.

To a 120 liter autoclave equipped with an agitator, 20% maleic acid anhydride solution (2 kg), styrene (14.5 kg), methyl methacrylate (17 kg), and t-dodecyl mercaptan (30 g) were added. The gas in the remaining space of the autoclave was replaced with nitrogen gas, and the temperature of the mixture was raised to 85° C. taking 40 minutes with agitation. After raising the temperature, the temperature of the mixture was kept at 85° C., the 20% maleic acid anhydride solution was added separately at an addition speed of 2.0 kg/hour, styrene was added separately at an addition speed of 500 g/hour, and the 2% t-butyl peroxy-2-ethyl hexanoate solution was added separately at an addition speed of 600 g/hour. Here, each of the solutions was added continuously for 6 hours. Subsequently, the separate addition of the 2% t-butyl peroxy-2-ethyl hexanoate solution was terminated, and t-butyl peroxy isopropyl monocarbonate (30 g) was added. On the other hand, the 20% maleic acid anhydride solution was added separately keeping the addition speed of 2.0 kg/hour, and styrene was added separately keeping the addition speed of 500 g/hour, and the temperature of the mixture was raised to 115° C. with a temperature raising speed of 10° C./hour taking 3 hours. The separate addition of the 20% maleic acid anhydride solution was terminated when the accumulated amount of the separate addition reached 18 kg, and the separate addition of the styrene was terminated when the accumulated amount of the separate addition reached 4.5 kg. After the temperature of the mixture was raised, the mixture was kept at 115° C. for 1 hour, and the polymerization was completed. After the polymerization was completed, a small amount of the polymerization solution was taken as a sample, and the polymerization rate for each of the monomers were measured. The polymerization solution was continuously fed to a twin-screw devolatilizing extruder using a gear pump, followed by devolatilization treatment of methyl isobutyl ketone, a small amount of unreacted monomers, and the like, thereby obtaining the copolymer A-6. In a similar manner as Example 1, the copolymer A-6 thus obtained was subjected to measurement of the polymerization rate for each of the monomers, composition, molecular weight, and haze. The results are shown in Table 1.

Formation of films, and measurement of film property were conducted in a similar manner as Example 1. The results of measurement are shown in Table 3.

Example 7

The 20% maleic acid anhydride solution and the 2% t-butyl peroxy-2-ethyl hexanoate solution were prepared in a similar manner as Example 1.

To a 120 liter autoclave equipped with an agitator, 20% maleic acid anhydride solution (3.5 kg), styrene (28.8 kg), methyl methacrylate (4 kg), and t-dodecyl mercaptan (30 g) were added. The gas in the remaining space of the autoclave was replaced with nitrogen gas, and the temperature of the mixture was raised to 90° C. taking 40 minutes with agitation. After raising the temperature, the temperature of the mixture was kept at 90° C., the 20% maleic acid anhydride solution was added separately at an addition speed of 2.7 kg/hour, and the 2% t-butyl peroxy-2-ethyl hexanoate solution was added separately at an addition speed of 500 g/hour. Here, each of the solutions was added continuously for 8 hours. Subsequently, the separate addition of the 2% t-butyl peroxy-2-ethyl hexanoate solution was terminated, and t-butyl peroxy isopropyl monocarbonate (40 g) was added. On the other hand, the 20% maleic acid anhydride solution was added separately keeping the addition speed of 2.7 kg/hour, and the temperature of the mixture was raised to 130° C. with a temperature raising speed of 10° C./hour taking 4 hours. The separate addition of the 20% maleic acid anhydride solution was terminated when the accumulated amount of the separate addition reached 32.5 kg. After the temperature of the mixture was raised, the mixture was kept at 130° C. for 1 hour, and the polymerization was completed. After the polymerization was completed, a small amount of the polymerization solution was taken as a sample, and the polymerization rate for each of the monomers were measured. The polymerization solution was continuously fed to a twin-screw devolatilizing extruder using a gear pump, followed by devolatilization treatment of methyl isobutyl ketone, a small amount of unreacted monomers, and the like, thereby obtaining the copolymer A-7. In a similar manner as Example 1, the copolymer A-7 thus obtained was subjected to measurement of the polymerization rate for each of the monomers, composition, molecular weight, and haze. The results are shown in Table 1.

Formation of films, and measurement of film property were conducted in a similar manner as Example 1. The results of measurement are shown in Table 3.

Comparative Example 1

The 20% maleic acid anhydride solution and the 2% t-butyl peroxy-2-ethyl hexanoate solution were prepared in a similar manner as Example 1.

To a 120 liter autoclave equipped with an agitator, 20% maleic acid anhydride solution (2 kg), styrene (24 kg), methyl methacrylate (12 kg), t-dodecyl mercaptan (30 g), and methyl isobutyl ketone (20 kg) were added. The gas in the remaining space of the autoclave was replaced with nitrogen gas, and the temperature of the mixture was raised to 87° C. taking 40 minutes with agitation. After raising the temperature, the temperature of the mixture was kept at 87° C., the 20% maleic acid anhydride solution was added separately at an addition speed of 1 kg/hour, and the 2% t-butyl peroxy-2-ethyl hexanoate solution was added separately at an addition speed of 250 g/hour. Here, each of the solutions was added continuously for 12 hours. Subsequently, the separate addition of the 2% t-butyl peroxy-2-ethyl hexanoate solution was terminated, and t-butyl peroxy isopropyl monocarbonate (30 g) was added. On the other hand, the 20% maleic acid anhydride solution was added separately keeping the addition speed of 1 kg/hour, and the temperature of the mixture was raised to 120° C. with a temperature raising speed of 5.5° C./hour taking 6 hours. The separate addition of the 20% maleic acid anhydride solution was terminated when the accumulated amount of the separate addition reached 18 kg. After the temperature of the mixture was raised, the mixture was kept at 120° C. for 1 hour, and the polymerization was completed. After the polymerization was completed, a small amount of the polymerization solution was taken as a sample, and the polymerization rate for each of the monomers were measured. The polymerization solution was continuously fed to a twin-screw devolatilizing extruder using a gear pump, followed by devolatilization treatment of methyl isobutyl ketone, a small amount of unreacted monomers, and the like, thereby obtaining the copolymer A-8. In a similar manner as Example 1, the copolymer A-8 thus obtained was subjected to measurement of the polymerization rate for each of the monomers, composition, molecular weight, and haze. The results are shown in Table 2.

Formation of films, and measurement of film property were conducted in a similar manner as Example 1. The results of measurement are shown in Table 3.

Comparative Example 2

The 20% maleic acid anhydride solution and the 2% t-butyl peroxy-2-ethyl hexanoate solution were prepared in a similar manner as Example 1.

To a 120 liter autoclave equipped with an agitator, 20% maleic acid anhydride solution (10 kg), styrene (24 kg), methyl methacrylate (12 kg), t-dodecyl mercaptan (30 g), and methyl isobutyl ketone (2 kg) were added. The gas in the remaining space of the autoclave was replaced with nitrogen gas, and the temperature of the mixture was raised to 87° C. taking 40 minutes with agitation. After raising the temperature, the temperature of the mixture was kept at 87° C., the 20% maleic acid anhydride solution was added separately at an addition speed of 0.85 kg/hour, and the 2% t-butyl peroxy-2-ethyl hexanoate solution was added separately at an addition speed of 375 g/hour. Here, each of the solutions was added continuously for 8 hours. Subsequently, the separate addition of the 2% t-butyl peroxy-2-ethyl hexanoate solution was terminated, and t-butyl peroxy isopropyl monocarbonate (30 g) was added. On the other hand, the 20% maleic acid anhydride solution was added separately keeping the addition speed of 0.85 kg/hour, and the temperature of the mixture was raised to 120° C. with a temperature raising speed of 8.25° C./hour taking 4 hours. The separate addition of the 20% maleic acid anhydride solution was terminated when the accumulated amount of the separate addition reached 10 kg. After the temperature of the mixture was raised, the mixture was kept at 120° C. for 1 hour, and the polymerization was completed. After the polymerization was completed, a small amount of the polymerization solution was taken as a sample, and the polymerization rate for each of the monomers were measured. The polymerization solution was continuously fed to a twin-screw devolatilizing extruder using a gear pump, followed by devolatilization treatment of methyl isobutyl ketone, a small amount of unreacted monomers, and the like, thereby obtaining the copolymer A-9. In a similar manner as Example 1, the copolymer A-9 thus obtained was subjected to measurement of the polymerization rate for each of the monomers, composition, molecular weight, and haze. The results are shown in Table 2.

Formation of films, and measurement of film property were conducted in a similar manner as Example 1. The results of measurement are shown in Table 4.

Comparative Example 3

A 14% maleic acid anhydride solution was prepared by dissolving maleic acid anhydride in methyl isobutyl ketone so that the maleic acid anhydride is contained by 14 mass %, and a 1% t-butyl peroxy-2-ethyl hexanoate solution was prepared by diluting t-butyl peroxy-2-ethyl hexanoate with methyl isobutyl ketone so that the t-butyl peroxy-2-ethyl hexanoate is contained by 1 mass %. These solutions were used in the polymerization.

To a 120 liter autoclave equipped with an agitator, 14% maleic acid anhydride solution (4 kg), styrene (26.4 kg), methyl methacrylate (8 kg), and t-dodecyl mercaptan (4 g) were added. The gas in the remaining space of the autoclave was replaced with nitrogen gas, and the temperature of the mixture was raised to 85° C. taking 40 minutes with agitation. After raising the temperature, the temperature of the mixture was kept at 85° C., the 14% maleic acid anhydride solution was added separately at an addition speed of 1.5 kg/hour, and the 1% t-butyl peroxy-2-ethyl hexanoate solution was added separately at an addition speed of 150 g/hour. Here, each of the solutions was added continuously for 17 hours. Subsequently, the separate addition of the 1% t-butyl peroxy-2-ethyl hexanoate solution was terminated, followed by taking a small amount of a sample from the polymerization solution, and then t-butyl peroxy isopropyl monocarbonate (60 g) was added. On the other hand, the 14% maleic acid anhydride solution was added separately keeping the addition speed of 1.5 kg/hour, and the temperature of the mixture was raised to 120° C. with a temperature raising speed of 5° C./hour taking 7 hours. The separate addition of the 14% maleic acid anhydride solution was terminated when the accumulated amount of the separate addition reached 36 kg. After the temperature of the mixture was raised, the mixture was kept at 120° C. for 1 hour, and the polymerization was completed. After the polymerization was completed, a small amount of the polymerization solution was taken as a sample, and the polymerization rate for each of the monomers were measured. The polymerization solution was continuously fed to a twin-screw devolatilizing extruder using a gear pump, followed by devolatilization treatment of methyl isobutyl ketone, a small amount of unreacted monomers, and the like, thereby obtaining the copolymer A-10. In a similar manner as Example 1, the copolymer A-10 thus obtained was subjected to measurement of the polymerization rate for each of the monomers, composition, molecular weight, and haze. The results are shown in Table 2.

Formation of films, and measurement of film property were conducted in a similar manner as Example 1. The results of measurement are shown in Table 4.

Comparative Example 4

The 20% maleic acid anhydride solution and the 2% t-butyl peroxy-2-ethyl hexanoate solution were prepared in a similar manner as Example 1.

To a 120 liter autoclave equipped with an agitator, 20% maleic acid anhydride solution (2.8 kg), styrene (26.4 kg), methyl methacrylate (8 kg), and t-dodecyl mercaptan (40 g) were added. The gas in the remaining space of the autoclave was replaced with nitrogen gas, and the temperature of the mixture was raised to 90° C. taking 40 minutes with agitation. After raising the temperature, the temperature of the mixture was kept at 90° C., the 20% maleic acid anhydride solution was added separately at an addition speed of 2.0 kg/hour, and the 2% t-butyl peroxy-2-ethyl hexanoate solution was added separately at an addition speed of 750 g/hour. Here, each of the solutions was added continuously for 8 hours. Subsequently, the separate addition of the 2% t-butyl peroxy-2-ethyl hexanoate solution was terminated, and t-butyl peroxy isopropyl monocarbonate (40 g) was added. On the other hand, the 20% maleic acid anhydride solution was added separately keeping the addition speed of 2.0 kg/hour, and the temperature of the mixture was raised to 120° C. with a temperature raising speed of 6° C./hour taking 5 hours. The separate addition of the 20% maleic acid anhydride solution was terminated when the accumulated amount of the separate addition reached 25.2 kg. After the temperature of the mixture was raised, the mixture was kept at 120° C. for 1 hour, and the polymerization was completed. After the polymerization was completed, a small amount of the polymerization solution was taken as a sample, and the polymerization rate for each of the monomers were measured. The polymerization solution was continuously fed to a twin-screw devolatilizing extruder using a gear pump, followed by devolatilization treatment of methyl isobutyl ketone, a small amount of unreacted monomers, and the like, thereby obtaining the copolymer A-11. In a similar manner as Example 1, the copolymer A-11 thus obtained was subjected to measurement of the polymerization rate for each of the monomers, composition, molecular weight, and haze. The results are shown in Table 2.

Formation of films, and measurement of film property were conducted in a similar manner as Example 1. The results of measurement are shown in Table 4.

Comparative Example 5

The 20% maleic acid anhydride solution and the 2% t-butyl peroxy-2-ethyl hexanoate solution were prepared in a similar manner as Example 1.

To a 120 liter autoclave equipped with an agitator, 20% maleic acid anhydride solution (8 kg), styrene (0.8 kg), methyl methacrylate (17.6 kg), and t-dodecyl mercaptan (30 g) were added. The gas in the remaining space of the autoclave was replaced with nitrogen gas, and the temperature of the mixture was raised to 88° C. taking 40 minutes with agitation. After raising the temperature, the temperature of the mixture was kept at 88° C., the 20% maleic acid anhydride solution was added separately at an addition speed of 2.5 kg/hour, and the 2% t-butyl peroxy-2-ethyl hexanoate solution was added separately at an addition speed of 250 g/hour. Here, each of the solutions was added continuously for 6 hours. Subsequently, the separate addition of the 2% t-butyl peroxy-2-ethyl hexanoate solution was terminated, and t-butyl peroxy isopropyl monocarbonate (10 g) was added. On the other hand, the 20% maleic acid anhydride solution was added separately keeping the addition speed of 2.5 kg/hour, and the temperature of the mixture was raised to 120° C. with a temperature raising speed of 16° C./hour taking 2 hours. The separate addition of the 20% maleic acid anhydride solution was terminated when the accumulated amount of the separate addition reached 20 kg. After the temperature of the mixture was raised, the mixture was kept at 120° C. for 1 hour, and the polymerization was completed. After the polymerization was completed, a small amount of the polymerization solution was taken as a sample, and the polymerization rate for each of the monomers were measured. The polymerization solution was continuously fed to a twin-screw devolatilizing extruder using a gear pump, followed by devolatilization treatment of methyl isobutyl ketone, a small amount of unreacted monomers, and the like, thereby obtaining the copolymer A-12. In a similar manner as Example 1, the copolymer A-12 thus obtained was subjected to measurement of the polymerization rate for each of the monomers, composition, molecular weight, and haze. The results are shown in Table 2.

Formation of films, and measurement of film property were conducted in a similar manner as Example 1. The results of measurement are shown in Table 4.

Comparative Example 6

The 20% maleic acid anhydride solution and the 2% t-butyl peroxy-2-ethyl hexanoate solution were prepared in a similar manner as Example 1.

To a 120 liter autoclave equipped with an agitator, 20% maleic acid anhydride solution (1 kg), styrene (36 kg), t-dodecyl mercaptan (30 g), and methyl isobutyl ketone (2 kg) were added. The gas in the remaining space of the autoclave was replaced with nitrogen gas, and the temperature of the mixture was raised to 90° C. taking 40 minutes with agitation. After raising the temperature, the temperature of the mixture was kept at 90° C., the 20% maleic acid anhydride solution was added separately at an addition speed of 0.73 kg/hour, and the 2% t-butyl peroxy-2-ethyl hexanoate solution was added separately at an addition speed of 250 g/hour. Here, each of the solutions was added continuously for 16 hours. Subsequently, the separate addition of the 2% t-butyl peroxy-2-ethyl hexanoate solution was terminated, and t-butyl peroxy isopropyl monocarbonate (40 g) was added. On the other hand, the 20% maleic acid anhydride solution was added separately keeping the addition speed of 0.76 kg/hour, and the temperature of the mixture was raised to 125° C. with a temperature raising speed of 3.5° C./hour taking 10 hours. The separate addition of the 20% maleic acid anhydride solution was terminated when the accumulated amount of the separate addition reached 19 kg. After the temperature of the mixture was raised, the mixture was kept at 125° C. for 1 hour, and the polymerization was completed. After the polymerization was completed, a small amount of the polymerization solution was taken as a sample, and the polymerization rate for each of the monomers were measured. The polymerization solution was continuously fed to a twin-screw devolatilizing extruder using a gear pump, followed by devolatilization treatment of methyl isobutyl ketone, a small amount of unreacted monomers, and the like, thereby obtaining the copolymer A-13. In a similar manner as Example 1, the copolymer A-13 thus obtained was subjected to measurement of the polymerization rate for each of the monomers, composition, molecular weight, and haze. The results are shown in Table 2.

Formation of films, and measurement of film property were conducted in a similar manner as Example 1. The results of measurement are shown in Table 4.

Comparative Example 7

Styrene-methyl methacrylate copolymer (available from DENKI KAGAKU KOGYO KABUSHIKI KAISHA, produce name: DENKA TX Polymer, grade name: "TX-800LF") was subjected to measurement of the polymerization rate for each of the monomers, composition, molecular weight, and haze, as in Example 1. The results are shown in Table 2.

Formation of films, and measurement of film property were conducted in a similar manner as Example 1. The results of measurement are shown in Table 4.

Name of Apparatus: 6890 series GC apparatus (available from Agilent Technologies)
Column: capillary column DB-1 (polysiloxane)
Programmed temperature gas chromatography was carried out with the initial column temperature of 60° C.
(Temperature Raising Conditions)
60° C.: held for 16 minutes
60 to 200° C.: raised by 20° C./min
200° C.: held for 8 minutes The polymerization rate was calculated by the following equation, using the measurement values thus obtained.
Amount of unreacted styrene monomer=a (ppm)
Amount of unreacted methyl methacrylate monomer=b (ppm)
Total amount of styrene monomer charged=d (parts by mass)

TABLE 1

|  |  | Example 1 | Example 2 | Example 3 | Example 4 | Example 5 | Example 6 | Example 7 |
|---|---|---|---|---|---|---|---|---|
| polymerization rate of ST at completion of polymerization | % | 95.3 | 94.9 | 94.7 | 95.8 | 92.7 | 97.8 | 92.8 |
| polymerization rate of MMA at completion of polymerization | % | 94.9 | 95.8 | 94.9 | 96.8 | 94.7 | 95.6 | 95.8 |
| polymerization rate of MAH at completion of polymerization | % | 99.7 | 99.9 | 99.7 | 99.7 | 99.5 | 99.8 | 99.6 |
|  |  | A-1 | A-2 | A-3 | A-4 | A-5 | A-6 | A-7 |
| composition analysis: ST unit | mass % | 59.8 | 65.4 | 69.6 | 59.6 | 79.3 | 47.9 | 70.9 |
| composition analysis: MMA unit | mass % | 29.8 | 20.0 | 17.9 | 35.2 | 10.1 | 41.8 | 10.1 |
| composition analysis: MAH unit | mass % | 10.4 | 14.6 | 12.5 | 5.2 | 10.6 | 10.3 | 19.0 |
| number average molecular weight (Mn) × $10^4$ | g/mol | 7.9 | 6.6 | 8.8 | 5.5 | 7.7 | 7.4 | 6.7 |
| weight average molecular weight (Mw) × $10^4$ | g/mol | 18.0 | 15.3 | 19.8 | 14.1 | 17.6 | 17.1 | 16.9 |
| haze of 2 mm plate | % | 0.4 | 0.2 | 0.6 | 0.8 | 0.9 | 0.4 | 1.0 |

*ST, MMA, and MAH in the Table are abbreviation of styrene monomer, methyl methacrylate monomer, and maleic acid anhydride monomer, respectively

TABLE 2

|  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| polymerization rate of ST at completion of polymerization | % | 95.5 | 92.9 | 92.6 | 98.5 | 99.9 | 91.5 |  |
| polymerization rate of MMA at completion of polymerization | % | 95.0 | 94.1 | 95.0 | 97.5 | 95.7 | — |  |
| polymerization rate of MAH at completion of polymerization | % | 99.5 | 99.8 | 99.8 | 99.7 | 96.9 | 99.3 |  |
|  |  | A-8 | A-9 | A-10 | A-11 | A-12 | A-13 | TX-800LF |
| composition analysis: ST unit | mass % | 59.8 | 59.3 | 65.0 | 66.0 | 20.7 | 89.2 | 54.0 |
| composition analysis: MMA unit | mass % | 29.8 | 30.1 | 20.2 | 19.8 | 65.3 | 0.0 | 46.0 |
| composition analysis: MAH unit | mass % | 10.4 | 10.6 | 14.8 | 14.2 | 14.0 | 10.8 | 0.0 |
| number average molecular weight (Mn) × $10^4$ | g/mol | 5.8 | 8.3 | 5.8 | 5.6 | 5.3 | 6.2 | 6.6 |
| weight average molecular weight (Mw) × $10^4$ | g/mol | 12.8 | 18.1 | 23.8 | 15.5 | 15.5 | 18.0 | 16.6 |
| haze of 2 mm plate | % | 0.7 | 3.6 | 0.8 | 8.6 | 1.0 | 2.8 | 0.2 |

*ST, MMA, and MAH in the Table are abbreviation of styrene monomer, methyl methacrylate monomer, and maleic acid anhydride monomer, respectively Here, the polymerization rate for each of the monomers were calculated by the following method.
(1) Styrene Monomer Polymerization Rate and Methyl Methacrylate Monomer Polymerization Rate The unreacted styrene monomer and methyl methacrylate monomer were measured for each of the polymerization solution samples using the following apparatus.

Total amount of methyl methacrylate monomer charged=e (parts by mass)

Total amount of maleic acid anhydride monomer charged=f (parts by mass)

Total amount of polymerization solvent charged=g (parts by mass)

Styrene monomer polymerization rate (%)=100−a×(d+e+f+g)/100d
Methyl methacrylate monomer polymerization rate (%)=100−b×(d+e+f+g)/100e (2) Maleic Acid Anhydride Polymerization Rate The unreacted maleic acid anhydride monomer was measured for each of the polymerization solution samples using the following apparatus.
Name of Apparatus: LC-10 (available from Shimadzu Corporation)
Detector and Analysing Wavelength: UV, 230 nm
Column: YMC YMC-PACK ODS-A A-312 (150 mm×6 mm, 5 μm)
Mobile Phase: $H_2O/CH_3OH$ 50/50 (pH 3.3 $H_3PO_4$)
Flow Rate: 1 ml/min
Injection Amount: 20 μl
Procedure: Sample (0.2 g) was weighed into a 50 ml Erlenmyer flask, followed by addition of 1,2-dichloroethane (5 ml) to dissolve the sample. Then, n-hexane (5 ml) was added to the solution, and the mixture was shook for 10 to 15 minutes using a shaker to allow precipitation of a polymer. The supernatant was filtered through a 0.45 μm membrane filter. The supernatant (3 ml) and purified water (3 ml) were added to a 10 ml measuring test tube, and the mixture was shook for 1 hour. The mixture was allowed to stand for 30 minutes, and then the lower layer solution was analysed by the afore-mentioned apparatus. Here, quantitative analysis was conducted by calculation with the absolute calibration curve method using a maleic acid anhydride standard solution.

The polymerization rate was calculated by the following equation, using the measurement values thus obtained.
Amount of unreacted maleic acid anhydride monomer=c (ppm)
Total amount of styrene monomer charged=d (parts by mass)
Total amount of methyl methacrylate monomer charged=e (parts by mass)
Total amount of maleic acid anhydride monomer charged=f (parts by mass)
Total amount of polymerization solvent charged=g (parts by mass)
Maleic acid anhydride monomer polymerization rate (%)=100−c×(d+e+f+g)/100f —Evaluation of Film Properties—

TABLE 3

| testing item | unit | Example 1 A-1 | Example 2 A-2 | Example 3 A-3 | Example 4 A-4 | Example 5 A-5 | Example 6 A-6 | Example 7 A-7 |
|---|---|---|---|---|---|---|---|---|
| film appearance | — | A | A | A | B | B | B | B |
| film strength | mJ | 11 | 10 | 15 | 5 | 6 | 7 | 5 |
| haze of non-stretched film | % | 0.6 | 0.5 | 0.9 | 1.1 | 1.5 | 1.8 | 2.3 |
| glass transition temperature | °C. | 120 | 128 | 124 | 110 | 119 | 120 | 135 |
| in-plane phase difference Re (590) | nm | 439 | 474 | 509 | 401 | 572 | 344 | 518 |
| thickness phase difference Rth Re (590) | nm | −210 | −274 | −255 | −198 | −284 | −172 | −255 |
| decreasing temperature | °C. | 125 | 130 | 125 | 110 | 120 | 120 | 140 |

TABLE 4

| testing item | unit | Comparative Example 1 A-8 | Comparative Example 2 A-9 | Comparative Example 3 A-10 | Comparative Example 4 A-11 | Comparative Example 5 A-12 | Comparative Example 6 A-13 | Comparative Example 7 TX-800LF |
|---|---|---|---|---|---|---|---|---|
| film appearance | — | B | C | C | C | C | B | A |
| film strength | mJ | <3 | <3 | 18 | <3 | <3 | <3 | 15 |
| haze of non-stretched film | % | 1.5 | 4.8 | 12.1 | 8.9 | 5.6 | 3.3 | 0.6 |
| glass transition temperature | °C. | 120 | 122(108) | 128 | 123 | 126 | 127 | 99 |
| in-plane phase difference Re (590) | nm | sample broke | sample broke | 479 | sample broke | sample broke | sample broke | 368 |
| thickness phase difference Rth | nm | sample broke | sample broke | −280 | sample broke | sample broke | sample broke | −180 |
| Re (590) decreasing temperature | °C. | unmeasureable | unmeasureable | 130 | unmeasureable | unmeasureable | unmeasureable | 90 |

Here, evaluation was conducted by the following methods.

(1) Determination of Film Appearance

Appearance was visually observed for 1 m² of the center portion (200 mm width×5 m length) of the non-stretched film. The appearance was determined as "A", "B", or "C" in accordance with the following criteria, and "A" and "B" were determined as acceptable.

- A: beautiful film with no defects found by visual observation and no defective phenomenon occurred with the film
- B: film with less than 10 small defects (approximately 0.08 to 0.2 mm) found by visual observation and no remarkable defective phenomenon such as die lines and melt fracture occurred with the film
- C: film with 1 or more remarkable defects (defects of 0.2 mm or larger including air voids), 10 or more small defects found by visual observation, or remarkable defective phenomenon such as die lines and melt fracture occurred with the film (2) Film Strength Test pieces were cut out from the non-stretched film. Falling ball impact test was conducted with the test pieces in accordance with the following conditions, and the impact energy at which 50% of the test pieces broke was measured.

Test Piece: 20 pieces of non-stretched film having the size of 50 mm length×50 mm Width×100±5 μm thickness Plumb Bob: iron ball of 11 mm diameter, 5.45 g weight Fixing Condition: The film was pinched with a ring (inner diameter: 34 mm), and was fixed firmly by 4 clips placed at upper, lower, left, and right positions.

The height at which 50% of the test pieces broke was measured with 1 cm interval in accordance with JIS K7211. The impact energy at which 50% of the test pieces broke was calculated from the results thus obtained. Here, the measuring jig was not able to carry out the test for the height of less than 5 cm. Therefore, the test pieces that broke with the height of 5 cm were all recorded as "<3 (mJ)". The ones with the impact energy at which 50% of the test pieces broke being 5 (mJ) or more were determined as acceptable.

(3) Film Transparency

Haze of the non-stretched film was measured in accordance with ASTM D1003. The ones with the haze of 3.0% or less were determined as acceptable.

(4) Optical Properties <Phase Difference Development>

The glass transition temperature of the non-stretched films were measured using a DSC apparatus "Robot DSC6200 (available from Seiko Instruments Inc.". Stretching was conducted by the following conditions.

Name of Apparatus: biaxial stretching testing apparatus EX10-B (available from Toyo Seiki Seisaku-Sho, Ltd.)

Test Piece: test piece having the size of 90 mm×90 mm×100±5 μm thickness was cut out from a non-stretched film Stretching Temperature: glass transition temperature+5° C.

Stretching Speed: 25 mm/min

Stretching Method: uniaxial stretching with free width, by a factor of 2.0

The in-plane phase difference Re(590) and the thickness phase difference Rth were measured with the film subjected to uniaxial stretching with free width, by using the apparatus described below. The ones having the in-plane phase difference Re(590) of 300 nm or more and the thickness phase difference Rth of less than 0 nm (negative) were determined as acceptable. Here, the ones which broke during the stretching due to lack of film strength were determined as unacceptable, since they were unmeasureable.

Name of Apparatus: birefringence measurement apparatus "KOBRA-WR (available from Oji Scientific Instruments)"

Measurement Wavelength: 590 nm (5) Heat Resistance

The films stretched in (4) were placed in a thermostat chamber for 24 hours, and then the in-plane phase difference Re(590) was measured. The temperature at which the in-plane phase difference decreases by 10% or more was defined as the Re(590) decreasing temperature. The ones having the Re(590) decreasing temperature of 110° C. or higher were determined as acceptable. Here, the temperature of the thermostat chamber was varied by 5° C. The films which broke in the evaluation of (4) were determined as unacceptable, since they were unmeasureable.

The Examples of the copolymer for optical compensation film according to the present invention were all excellent in film appearance, film strength, film transparency, optical properties (negative phase difference development), and heat resistance. However, the Comparative Examples of the copolymer which did not satisfy the conditions of the present invention were inferior in either one of film appearance, film strength, film transparency, optical properties (negative phase difference development), and heat resistance.

—Evaluation of Applicability for Optical Compensation Film—

Example 8

The copolymer A-1 obtained in Example 1 was used to prepare a non-stretched film having a thickness of 0.25 mm, using the film forming machine described in Example 1. The non-stretched film thus obtained was cut into a square of 120 mm each side. Then, using a biaxial stretching apparatus (available from Toyo Seiki Seisaku-Sho, Ltd.), the film cut out was subjected to stretching at 124° C. by a factor of 2.5 in one direction with a stretching speed of 25 mm/min, followed by fixed uniaxial stretching by a factor of 1 in an orthogonal direction. Accordingly, Film A1 having a thickness of 0.10 mm was obtained.

Then, a norbornene-based resin (ZEONEX "690R", available from Zeon Corporation) was used to prepare a non-stretched film having a thickness of 0.13 mm in a similar manner. The non-stretched film thus obtained was cut into a square of 120 mm each side. Then, using a biaxial stretching apparatus (available from Toyo Seiki Seisaku-Sho, Ltd.), the film cut out was subjected to stretching at 135° C. by a factor of 2.0 in one direction with a stretching speed of 25 mm/min, thereby obtaining Film B1 uniaxially stretched with free width having a thickness of 0.08 mm.

With respect to Film A1 and Film B1, Re(450), Re(590), and Re(750), which are in-plane phase difference for the wavelengths of 450 nm, 590 nm, and 750 nm respectively, Nz coefficient, and the three-dimensional refractive index were measured using the birefringence measurement apparatus "KOBRA-WR (available from Oji Scientific Instruments)". The results are shown in Table 5.

Further, a layered film was obtained by layering Film A1 and Film B1 so that their slow axes cross at right angles. With respect to the layered film thus obtained, Re(450), Re(590), and Re(750), which are in-plane phase difference for the wavelengths of 450 nm, 590 nm, and 750 nm respectively, and Nz coefficient were measured using the birefringence measurement apparatus "KOBRA-WR (available from Oji Scientific Instruments)". The results are shown in Table 5.

TABLE 5

Example 8

| sample name | thickness (mm) | in-plane phase difference (nm) | | | three-dimensional refractive index | | | Nz coefficient | orientation birefringence |
|---|---|---|---|---|---|---|---|---|---|
| | | Re(450) | Re(590) | Re(750) | nx | ny | nz | | |
| Film A1 | 0.08 | 730 | 660 | 643 | 1.5568 | 1.5503 | 1.5588 | −0.30 | negative |
| Film B1 | 0.10 | 942 | 941 | 928 | 1.5409 | 1.5295 | 1.5292 | 1.03 | positive |
| laminated film | 0.18 | 204 | 278 | 284 | 1.5461 | 1.5446 | 1.5454 | 0.48 | — |

By using the copolymer for optical compensation film of the present invention, an optical compensation film achieving the desirable characteristic of the retardation film for improving the view angle of the liquid crystal display, that is, an optical compensation film having an in-plane phase difference (Re) of 60 to 300 nm, and an orientation parameter (Nz) in the range of 0.5±0.1, can be prepared. Further, an optical compensation film having the reverse wavelength dispersion characteristic, that is, an optical compensation film satisfying the relationship of Re(450)<Re(590)<Re(750), can be obtained. Here, the reverse wavelength dispersion characteristic is regarded as ideal from the viewpoint of color compensation.

INDUSTRIAL APPLICABILITY

According to the present invention, a copolymer for optical compensation film showing a negative orientation birefringence, having excellent transparency, heat resistance, film strength, and optical properties, and is capable of obtaining a beautiful film suitable for an optical compensation film can be provided.

Although a few embodiments of the present invention have been shown and described, it would be appreciated by those skilled in the art that changes may be made in this embodiment without departing from the principles and spirit of the invention, the scope of which is defined in the claims and their equivalents.

The invention claimed is:

1. An optical compensation film, wherein
the optical compensation film has a refractive index profile of nx>nz>ny and is obtained by laminating Film A and Film B, Film A being obtained by stretching a thermoplastic resin film showing a negative orientation birefringence, Film B being obtained by stretching a thermoplastic resin showing a positive orientation birefringence; and
the thermoplastic resin film for Film A comprises a copolymer, wherein
the copolymer comprises:
45 to 80 mass % of an aromatic vinyl monomer unit;
5 to 45 mass % of a (meth)acrylic acid ester monomer unit; and
5 to 20 mass % of an unsaturated dicarboxylic acid anhydride monomer unit; wherein
the copolymer has an average number molecular weight (Mn) of $5.5 \times 10^4$ to $9 \times 10^4$ and a weight average molecular weight (Mw) of $14 \times 10^4$ to $20 \times 10^4$; and
the copolymer has a haze of 1% or less, the haze being measured with a 2 mm thick sample in accordance with ASTM D1003, wherein
Film A and Film B are laminated so that slow axes thereof cross at right angles, allowing in-plane phase difference to satisfy the relationship of Re(450)<Re(590)<Re(750), Re(450), Re(590), and Re(750) being in-plane phase difference for the wavelengths of 450 nm, 590 nm, and 750 nm, respectively.

2. The optical compensation film of claim 1, wherein Film A is obtained by stretching a film manufactured by melt extrusion.

3. The optical compensation film of claim 1, wherein Nz coefficient is 0.4 to 0.6.

4. The optical compensation film of claim 1, wherein the copolymer comprises:
55 to 75 mass % of the aromatic vinyl monomer unit;
15 to 35 mass % of the (meth)acrylic acid ester monomer unit; and
10 to 15 mass % of the unsaturated dicarboxylic acid anhydride monomer unit.

5. The optical compensation film of claim 1, wherein the aromatic vinyl monomer unit is a styrene unit.

6. The optical compensation film of claim 1, wherein the (meth)acrylic acid ester monomer unit is a methyl methacrylate unit.

7. The optical compensation film of claim 1, wherein the unsaturated dicarboxylic acid anhydride monomer unit is a maleic acid anhydride unit.

* * * * *